Nov. 15, 1927. 1,649,661
J. H. BURNFIEL
DIRIGIBLE HEADLIGHT
Filed Dec. 4 1926  2 Sheets-Sheet 1

Inventor
J. H. Burnfiel
By Watson E. Coleman
Attorney

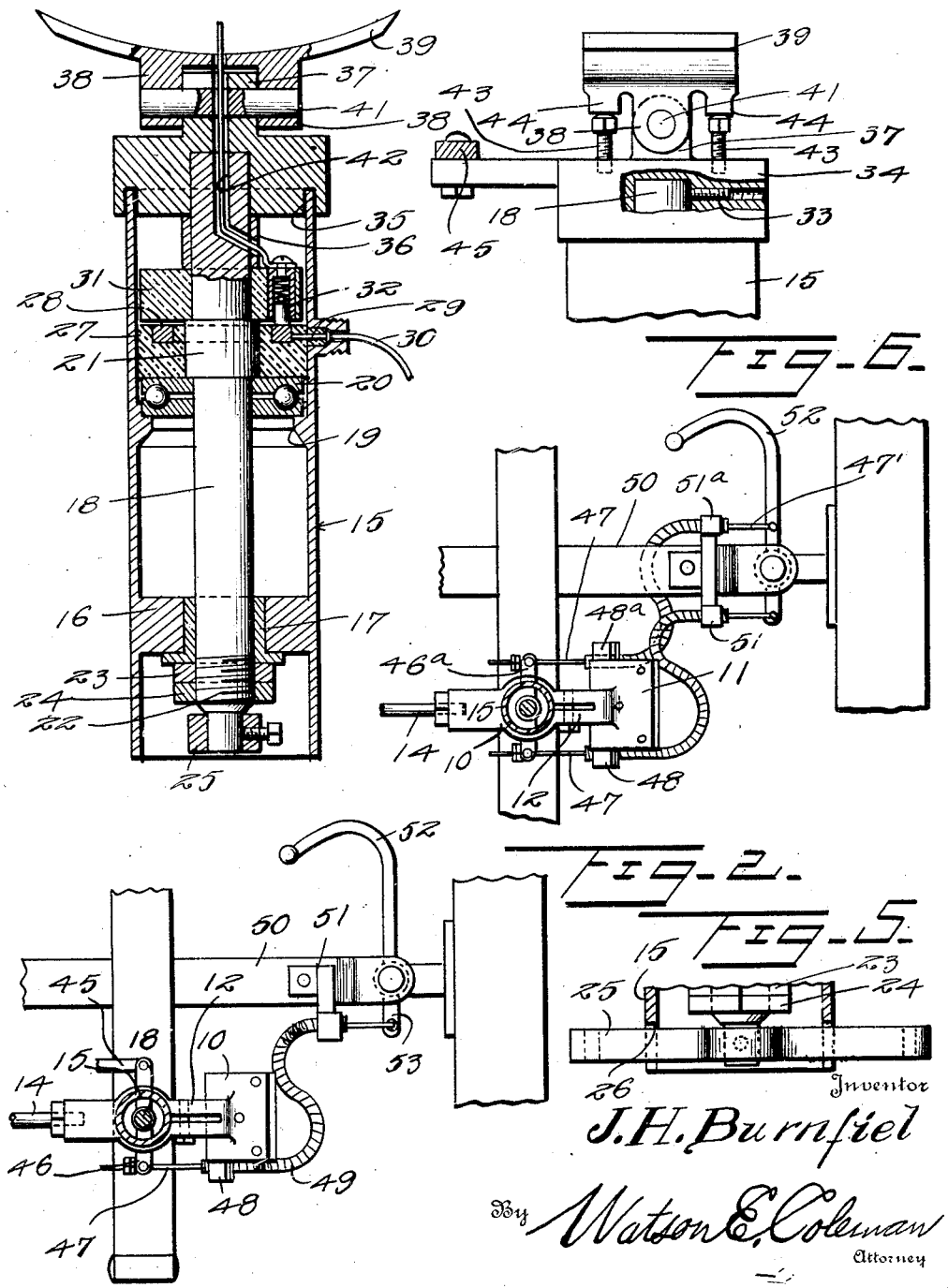

Patented Nov. 15, 1927.

1,649,661

UNITED STATES PATENT OFFICE.

JAMES H. BURNFIEL, OF SOUTH AKRON, OHIO.

DIRIGIBLE HEADLIGHT.

Application filed December 4, 1926. Serial No. 152,643.

This invention relates to dirigible headlights.

An important object of the invention is the provision of a mounting for the headlight, such that the headlight may be very readily rotated, thus permitting operation thereof by a relatively fragile element, such as a Bowden wire connection.

A further object of the invention is to provide novel and improved means for maintaining the headlights in substantial alignment with the front wheels of the vehicle.

A still further object of the invention is the provision of a structure such that the vertical angle of the beam of the headlight with respect to the horizontal may be readily adjusted.

These and other objects I attain by the construction shown in the accompanying drawings, wherein for the purpose of illustration is shown a preferred embodiment of my invention and wherein:—

Figure 2 is a plan view of the control mechanism, a portion of the headlight mounting being shown in section;

Figure 3 is a vertical sectional view through the headlight mounting;

Figure 4 is a fragmentary side elevation of the headlight mounting showing the means for adjusting the angle of the headlight;

Figure 5 is a fragmentary sectional view through the headlight mounting at the lower end thereof showing the disposition of the control and connecting arms;

Figure 6 is a fragmentary view similar to that shown in Figure 2 and illustrating a modified control mechanism;

Figure 1:
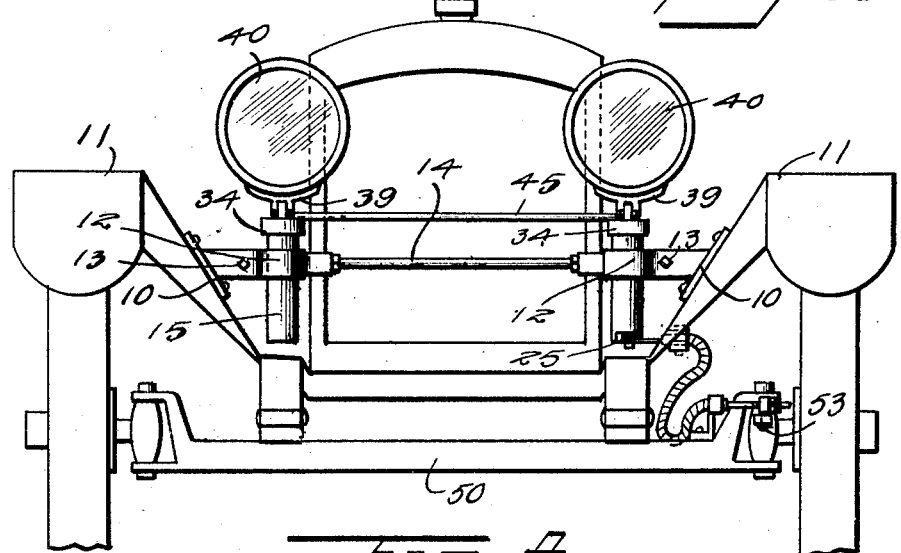
Figure 1 is a front elevation of a vehicle having dirigible headlight mechanism and control elements therefor constructed in accordance with my invention.

Referring now more particularly to the drawings, the numeral 10 generally designates suitable brackets adapted to be attached to the fenders 11 of a vehicle and formed at their outer ends with split collars 12 which may be restricted by clamping screws 13. Adjacent faces of the collars are preferably braced to one another by a transversely extending brace 14.

Mounted within the collars are vertically extending tubular casings 15 which are each provided interiorly adjacent their lower ends with a flange 16 providing a seat for a bearing 17 through which is directed a shaft 18. Above the flange 16 in spaced relation thereto, each casing is provided with an interior shoulder 19 forming a seat for the thrust bearing 20. The shaft 18 is provided with an enlargement 21, the lower end of which seats upon the upper member of the thrust bearing to limit downward movement of the shaft therethrough. Below the bearing 17, the shaft 18 is threaded at 22 and has adjusting and lock nuts 23 and 24 mounted thereon. The lower end of this shaft has secured thereto an arm 25 operating within a notch 26 formed in the casing.

Mounted within and held against rotation with relation to the casing immediately above the thrust bearing 20 is an insulating ring 27 having in its uppper surface an annular ring contact 28 from which a lead 29 extends through and is insulated from the wall of the casing. This lead may be connected with the lead wire 30 controlling the headlight. Secured to and held against rotation with relation to the shaft 18 and seating at its lower end upon the enlargement 21 is a second insulating ring 31 having mounted therein a spring-pressed brush 32 for engagement with the annular ring contact 28. Secured to the upper end of the shaft 18, by a set-screw 33, is a cap 34, the lower face of which has an annular groove 35 within which the upper end of the wall of the tubular casing 15 extends. A sleeve 36 surrounding the shaft 15 between the upper surface of the insulating ring 31 and the cap 34 limits downward movement of the cap and insures against binding engagement between the upper wall of this groove and the upper face of the side wall of the casing.

The cap 34 has upon its upper surface an apertured ear 37 adapted to extend between corresponding ears 38 formed upon a headlight bracket 39 to which the headlight 40 is directly secured. A pin 41 connects the ears for rotation. Through the base of the bracket 39, the ear 37, cap 34, pin 41 and the upper end of the shaft 15, a bore 42 is formed for the passage of a lead wire for controlling the illuminating element of the headlight.

The bore, at its lower end, has an angular portion extending through the sleeve 36, so that the lead wire may be electrically connected with the brush 32 to complete the circuit. Threaded in the cap 34, at opposite sides of the pivotal center of the bracket 39, are a pair of adjusting screws 43, the heads of which are adapted to abut against the bracket 39 through lugs 44 and provide a means whereby the horizontal angle of the bracket and accordingly the angle of the beam of the headlight, with respect to the horizontal, may be adjusted. Where a pair of headlights are provided with mountings of this character, the shafts 18 are preferably link-connected with one another as, for example, by a bar 45 to maintain the headlight brackets in desired relation with one another.

It will be obvious that a headlight mounting of this character may be very readily rotated and that accordingly a very light drive, such as a Bowden wire connection, may be provided for connecting the headlights with the steering mechanism of the vehicle. Such connections I have illustrated in Figures 1, 2, 6, 7 and 8 of the drawings.

In the form shown in Figures 1 and 2, the shaft of one of the headlights is provided upon its lower end with an operating arm 46 at present shown as formed integrally with and projecting rearwardly from the arm 25 to which one end of a Bowden wire 47 is adjustably connected. The adjacent fender bracket 10 is provided with a clamp 48 securing one end of the Bowden wire housing or flexible tubing 49, while the axle 50 of the vehicle is provided with a similar clamp 51. The opposite end of the Bowden wire 47 is operatively secured to the steering arm 52 at a point spaced from the pivotal center thereof. In this figure, an extension bracket 53 is attached directly to the steering arm.

In Figure 6, the structure above recited is reinforced by a substantially duplicate structure including additional clamps 48ª upon the fender bracket and 51ª upon the axle. Instead of employing the arm 46, a cross arm 46ª is provided, to one end of which the wire 47 is adjustably connected. A second wire 47ª is connected to the opposite end of the cross arm at one end and at its opposite end is directly connected to the steering arm 52.

In the form shown in Figure 7, the structure is again varied from that shown in the figure last discussed by providing the king bolt 54 of the steering arm with a T head 55 to which the Bowden wires 47, 47ª are connected. This figure also illustrates the fact that adjustment of these Bowden wires as to effective length may be made at either end of the wire, the adjustment in the present instance being at that end of the wires which are secured to the T head.

Figure 8:
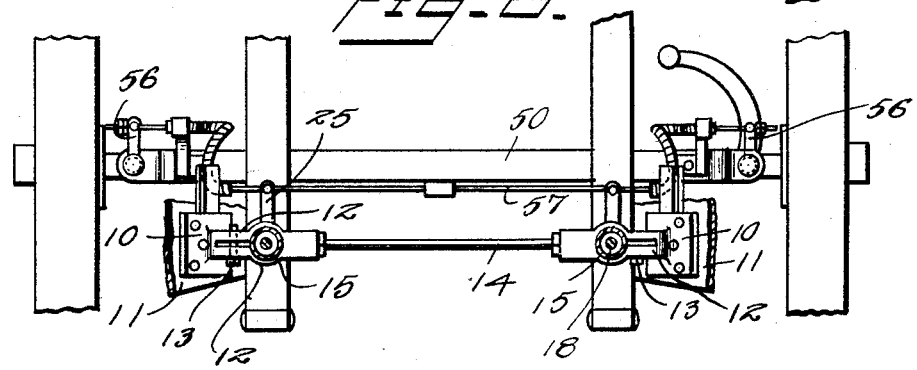
Figure 8 is a horizontal sectional view taken through the front section of the automobile showing a still further modification of control mechanism.
Figure 7:
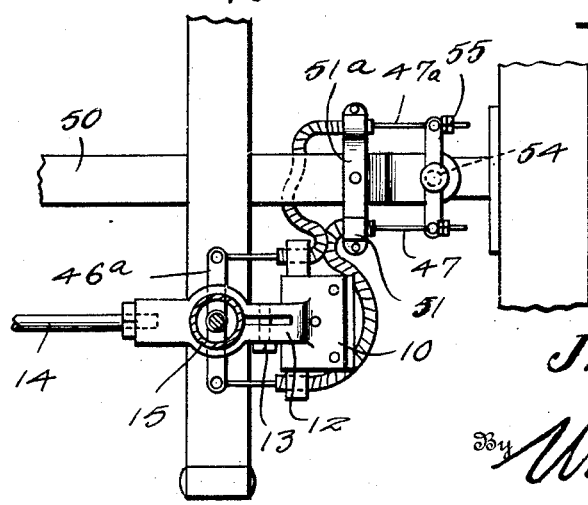
Figure 7 is a similar view illustrating a still further modification of the control mechanism.

In Figure 8, a further variation of the structure shown in Figure 1 is disclosed. Here the structure of this latter figure is duplicated at opposite ends of the axle and upon the fender brackets at opposite sides of the vehicle, with the exception of the fact that the upper end of the king bolts 54 are provided with angular extensions 56 to which the wires are connected. These wires are, in fact, opposite ends of a single wire, which, in this structure, will provide a connection 57 between the lamp units, insuring their movement in unison and replacing the bar 45.

It will be obvious that the construction hereinbefore set forth is capable of a certain range of change and modification without materially departing from the spirit of the invention and I accordingly do not limit myself to such specific structure except as hereafter claimed.

I claim:—

In a headlight mounting, a tubular housing provided adjacent its lower end with an inwardly directed flange, a bearing seated in said flange, a shaft co-axial with the housing and directed through the bearing, an upwardly facing annular shoulder formed upon the interior of the housing in spaced relation to said flange, a thrust bearing seated upon said shoulder, the shaft having an enlargement the lower end of which engages the thrust bearing, means at the lower end of the shaft and engaging the lower end of the first named bearing for maintaining the enlargement of the shaft in engagement with the thrust bearing, a cap carried by the upper end of the shaft and closing the upper end of the housing, a headlight carried by said cap, a brush insulated from the shaft and held against rotation with relation thereto and disposed interiorly of said housing and an annular contact carried by and held against rotation with relation to the housing with which said brush coacts.

In testimony whereof I hereunto affix my signature.

JAMES H. BURNFIEL.